United States Patent Office 2,764,557
Patented Sept. 25, 1956

2,764,557

REACTIVATION OF METAL-POISONED CATALYSTS

Harry G. Doherty, Pitman, and Charles J. Plank, Woodbury, N. J., assignors to Socony Mobil Oil Company, Inc., a corporation of New York No Drawing. Application November 4, 1952, Serial No. 318,747

9 Claims. (Cl. 252—411)

This invention relates to a process for treating a catalytic composite useful in the conversion of higher boiling hydrocarbons to lower boiling hydrocarbons such as gasoline. More particularly, the present invention is concerned with a method for treating siliceous cracking catalysts poisoned by metal contaminants. The present invention is specifically directed to a method for reactivating siliceous cracking catalysts which have become poisoned during hydrocarbon conversion operations by the contaminating effects of minute amounts of nickel.

Siliceous cracking catalysts, including naturally occurring activated clays and synthetically prepared composites, have long been recognized as useful in catalytically promoting hydrocarbon conversion reactions. Such siliceous catalysts contain silica and one or more metal oxides. In clays, the metal oxide present is predominantly alumina. Active synthetic cracking catalysts are generally gels or gelatinous precipitates and include silica-alumina, silica-zirconia, silica-beryllia, and silica-magnesia, as well as ternary combinations such as silica-alumina-zirconia, silica - alumina - beryllia, and silica - alumina - magnesia. Ordinarily, this type of catalyst contains silica and at least one material selected from the group of alumina, zirconia, beryllia, and magnesia. Other metal oxides may also be present, if desired, generally in small percentage, such as those of manganese, chromium, titanium, tungsten, molybdenum, and calcium. Synthetic siliceous cracking catalysts may be prepared by various well-known methods, such as by co-gelation or co-precipitation of the silica and metal oxide, or by milling together the separately precipitated or gelled components. Alternatively, the metal oxide may be combined with a previously formed siliceous gel utilizing impregnation or base exchange techniques. The present invention, however, is not limited to catalysts prepared by an particular method but is of general application to siliceous cracking catalysts. It will thus be understood that the catalysts undergoing treatment in accordance with the present invention may be any of the siliceous cracking catalysts heretofore customarily employed, which are susceptible to poisoning by the presence of nickel contaminant. It will further be understood that the treatment described herein may be performed on metal-poisoned catalysts before the same have been used in hydrocarbon conversion or on metal-poisoned catalysts which have been previously utilized in promoting the conversion of hydrocarbons.

Commercial catalytic cracking is carried out by contacting a hydrocarbon charge in the vapor or liquid state with a catalyst of the foregoing type under conditions of temperature, pressure, and time to achieve substantial conversion of the charge to lower boiling hydrocarbons. This cracking reaction results in deposition of a carbonaceous deposit commonly called "coke" with consequent decline in catalytic activity of the catalyst. Under conditions to obtain efficient operation from a yield standpoint, it is found desirable to terminate the cracking reaction after a relatively short conversion run, for example, of from 5 to 15 minutes on stream, and thereafter to restore the activity of the catalyst by burning off the coke in a regeneration stage. The formation of coke represents a net loss, since hydrocarbons are consumed in its production. In addition, it is apparent that the greater the coke deposit, the longer the regeneration period would have to be in proportion to the on-stream period in order not to exceed detrimental temperature levels during regeneration.

Minute amounts of nickel are highly detrimental to the efficiency of the siliceous cracking catalysts above-described. Such catalysts, contaminated even with an extremely small amount of nickel, exhibit decreased activity and excessive coke formation during cracking reactions. In fact, commercial experience with such a poisoned catalyst shows about 50 per cent more coke made by the catalyst at equilibrium activity than is produced by the catalyst in unpoisoned condition. Furthermore, since the major portion of the catalyst remains in the cracking system over an extended period of time with recirculation, the amount of nickel contaminant gradually builds up to such a point that further contact of the cracking charge with the catalyst becomes an uneconomical operation. The nickel contaminant may be introduced during preparation of the catalyst, or it may be introduced with the charge stock, or it may be eroded from the equipment. Regardless of its manner of introduction, the presence of nickel contaminant in the siliceous cracking catalyst employed is definitely detrimental, leading to the production of an excessive amount of coke.

The poisoning effects of minute amounts of nickel on siliceous cracking catalysts have heretofore been recognized in the art. Various techniques have been suggested to remove the nickel contaminant. In general, such techniques have involved rather drastic measures, including chemical attack on the nickel poison. In some cases, excessive heat treatment has been suggested for removing the nickel contaminant despite the danger of surface destruction in the catalyst due to sintering.

It is a major object of this invention to overcome the difficulties caused by the poisoning effects of nickel contaminant on the conversion efficiency of siliceous cracking catalysts. A more specific object is the provision of a method for reducing excessive coke formation on siliceous cracking catalysts contaminated with minute amounts of nickel without resorting to the drastic measures necessary to remove the nickel. A further object is to provide a process for reactivation of such contaminated catalyst.

The above and other objects which will be apparent to those skilled in the art are achieved by the process described herein. Broadly, the present invention involves treatment of a nickel-poisoned siliceous cracking catalyst by impregnating the same with chromia and subjecting the impregnated catalyst to a mild steam treatment. Such method of treatment under conditions set forth hereinafter has been found to completely deactivate the offending nickel contaminant, restoring the catalyst to a normal or better than normal gasoline-to-coke ratio.

The catalysts reactivated in accordance with the present invention include both synthetic and natural siliceous composites containing a major proportion of silica and a minor proportion of one or more metal oxides as described above. The catalysts treated in accordance with the present process are further characterized by the presence therein of a small amount of nickel contaminant. Generally, a very minute amount of nickel, as low as 0.006 per cent by weight of the catalytic composite, will exert a detrimental poisoning effect on the cracking characteristics of the described siliceous cracking catalysts. It is contemplated that such siliceous catalysts, contaminated with nickel up to the extent of about 0.20 per cent by weight, may be effectively reactivated in accordance with the present process.

In practice of the invention, a nickel-poisoned siliceous cracking catalyst is impregnated with chromic oxide. The impregnation may be carried out in any feasible manner and generally by contacting the poisoned catalyst with a solution of a soluble chromium compound, which decomposes to leave a residue corresponding substantially to chromic oxide after calcination. The impregnation may be carried out either batch-wise, in which case the catalyst is permitted to remain in contact with the impregnating solution under generally static conditions for a predetermined length of time and is then removed therefrom, or treatment may be effected by continuously percolating the impregnating solution through a bed of the catalyst. The deactivated catalyst may also be impregnated in situ by the addition of an oil-soluble chromium compound to the charge stock, which lays down a deposit of chromia on the catalyst under the prevailing hydrocarbon conversion conditions, causing deactivation of the nickel poison as the charge stock is contacted with the catalyst. This latter method is particularly attractive from a commercial standpoint since it represents a method of reactivation which eliminates the need for unscheduled shutdowns, thereby realizing considerable economic advantages. In some cases, vaporous impregnation of the poisoned catalyst may be desirable. In such method, the poisoned catalyst is brought into contact with vapors of a chromium compound which, upon subsequent calcination, will leave a residue of chromic oxide.

The amount of chromia deposited on the nickel-poisoned catalyst and the conditions under which impregnation is carried out are such as to substantially improve the cracking characteristics of the catalyst upon subsequent steam-treatment as indicated by an increase in the gasoline-to-coke ratio. It will be understood that the amount of chromia impregnated on the catalyst is desirably such as to overcome the poisoning effects of the nickel contaminant. Without being limited by any theory, it is postulated that the nickel poison may be rendered inactive by combination with the chromia to form nickel chromite and that subsequent steam-treatment mobilizes this reaction, thereby enhancing the conversion of nickel from a poisonous to a nonpoisonous state. This postulation finds support in the fact that the nickel content of the catalyst is not diminished by the present treatment and, further, in that subsequent steam-treatment of the chromia-impregnated catalyst effects a marked increase in the cracking efficiency of such catalyst. Accordingly, it is contemplated that an amount of chromia should be deposited on the poisoned catalyst in slight excess of the stoichiometric equivalent of the amount of nickel contaminant contained in the catalyst, that is, the amount of chromia impregnated on the nickel-poisoned catalyst should be such that slightly more than 2 atoms of chromium are present for each atom of nickel. In some cases, however, less than this amount of chromia may be sufficient to give appreciable improvement. It is to be understood that the amount of chromia deposited on the nickel-poisoned catalyst cannot be defined strictly but, rather, is of such quantity as to bring about, after steam-treatment of the catalyst, a substantial improvement in the cracking efficiency of the catalyst, as indicated by an increase in the gasoline-to-coke ratio. Generally, the amount of chromia deposited on the nickel-poisoned catalyst, in accordance with the present process, is a small amount, less than about 0.5 per cent by weight of the catalyst.

The chromium compound used for impregnating is one which will decompose to leave a residue of chromia upon subsequent calcination of the catalyst. The impregnation may be effected with a solution of such compound in an appropriate solvent, or the poisoned catalyst may be contacted with vapors of a suitable chromium compound. When aqueous solutions of the chromium compound are employed, the compound is generally an inorganic salt, such as chromic nitrate, chromic acetate, ammonium chromate, and ammonium dichromate. On the other hand, if the chromium compound is added to the petroleum charge stock, it should be oil-soluble, and consequently organic chromium compounds will generally be employed under such conditions. Suitable compounds for such method of operation include chromium naphthenate, chromium oxalate, complex chromium cyanides, and the like.

After impregnation, the catalyst is dried, calcined at an elevated temperature sufficient to effect deposition of chromia on the catalyst by decomposition of the particular chromium-impregnating compound used, and the catalyst is then subjected to a mild steam-treatment. The exposure of the previously chromia-impregnated catalyst to steam is, as will appear from data set forth hereinafter, a necessary step in the present reactivation procedure. Steam treatment may be carried out at a temperature within the approximate range of 800 to 1500° F. for at least about 2 hours. Usually, steam at a temperature of about 1000 to 1300° F. will be used, with the treating period extending from about 2 to about 48 hours. Temperatures above 1500° F., and generally above 1300° F. for the clay catalysts, may be detrimental and should be avoided. As long as critically high temperatures, which cause rapid shrinkage or sintering of the catalyst, are avoided, longer periods of treatment than above designated apparently have no adverse effect. Also an atmosphere consisting of a substantial amount of steam, say, at least about 10 per cent by volume, but containing air or other gas substantially inert with respect to the composite being treated, may be used, and such mixtures are, in fact, desirable with the use of the more elevated temperatures to avoid possible deactivation of the catalyst.

After the above-described impregnation and steam-treatment, the catalyst is in a reactivated state and may be introduced or returned to the conversion chamber of the cracking unit for further use in catalytically promoting the conversion of higher boiling hydrocarbons to hydrocarbons boiling in the range of gasoline.

The following examples will serve to illustrate the process of the invention without limiting the same:

*Example 1*

A siliceous synthetic gel cracking catalyst containing about 93 per cent $SiO_2$ and about 7 per cent $Al_2O_3$ and contaminated with about 87 p. p. m. of nickel was tested in the standard CAT–A activity test. The product gave very high coke yields both before and after steam-treatment.

The steam-treated material was then impregnated with 0.18 per cent by weight of $Cr_2O_3$ by adsorption from an aqueous solution of chromic nitrate. The impregnation was carried out at room temperature and atmospheric pressure for a period of about 24 hours. The catalyst was then dried and calcined at 1000° F. for about 16 hours. This product, upon testing in the CAT–A test, gave a very high coke yield. The chromia-impregnated catalyst was then subjected to steam-treatment at 1200° F. for 10 hours with 100 per cent steam. The resulting catalyst showed a greatly improved gasoline-to-coke ratio.

The treating conditions and CAT-A data for each of the above catalysts are set forth in the following table:

TABLE I

| Catalyst No. | A | B | C | D |
|---|---|---|---|---|
| Treatment to Catalyst | None | Catalyst A + Steam Treatment 1 | Catalyst B + Cr₂O₃ | Catalyst B + Cr₂O₃ + Steam Treatment 2 |
| Ni, p. p. m. | 87 | 87 | 87 | 87 |
| Cr₂O₃, Percent Wt. | 0 | 0 | 0.18 | 0.18 |
| CAT-A Data: | | | | |
| Bulk Density | 0.74 | 0.76 | 0.77 | 0.78 |
| Gas Gravity | 1.17 | 1.23 | 0.92 | 1.53 |
| Gas, Percent Wt. | 7.2 | 7.9 | 7.2 | 3.7 |
| Coke, Percent Wt. | 2.6 | 2.7 | 3.1 | 1.4 |
| Gasoline (Vol. Percent at 410° F.) | 31.8 | 33.8 | 26.5 | 32.1 |
| Gasoline/Coke Ratio | 12.2 | 12.5 | 8.5 | 23.0 |

¹ 24 hrs. at 1100° F.—100% steam.
² 10 hrs. at 1200° F.—100% steam.

It will be noted from the above data that the nickel-poisoned catalyst cannot be reactivated by either steam treatment alone or impregnation with chromia. However, when the poisoned catalyst is impregnated with chromia and thereafter steam-treated, there is a decided rise in the gasoline/coke ratio. Simultaneously, a substantial rise in the gas gravity and reduction in the gas make are effected. These facts indicate a measurable reduction in the cracking to highly undesirable light gases. In addition, and of even more importance, the coke laydown is reduced to an unexpected degree; in fact, to a lower value than would be expected from a normal non-poisoned catalyst of the same activity.

*Example 2*

A siliceous gel cracking catalyst containing about 90.85 per cent $SiO_2$, 9 per cent $Al_2O_3$, and 0.15 per cent $Cr_2O_3$, and contaminated with about 566 p. p. m. of nickel was tested, after steam-treatment, in the standard CAT-A activity test. The product gave a high coke yield.

The steam-treated material was then impregnated with 0.19 per cent by weight of $Cr_2O_3$ by adsorption from an aqueous chromic nitrate solution at room temperature. Impregnation was carried out by contacting 194 grams of the poisoned catalyst with 250 cc. of 0.83 per cent by weight of aqueous chromic nitrate for a period of about 16 hours. The catalyst was then dried, calcined at 1000° F., steam-treated, and then evaluated in the standard CAT-A activity test. The data are summarized in the table below:

TABLE II

| Catalyst and Treatment ¹ | CAT-A Data | | | | | Gasoline/Coke | Ni, p. p. m. | Cr₂O₃, Percent Wt. |
|---|---|---|---|---|---|---|---|---|
| | Bulk Density | Gas Gravity | Gas, Percent Wt. | Coke, Percent Wt. | Gasoline (Vol. percent at 410° F.) | | | |
| Poisoned Catalyst | 0.75 | 0.83 | 3.5 | 1.5 | 23.2 | 15.5 | 566 | 0.15 |
| Poisoned Catalyst +0.19% Cr₂O₃+ Steam-Treatment | 0.75 | 1.12 | 3.5 | 1.0 | 26.3 | 26.3 | 566 | 0.34 |

¹ Catalyst steam-treated 10 hours at 1200° F.—100% steam.

From the above data, it will be seen that impregnation of the poisoned catalyst with chromia, followed by steam-treatment, brought about a marked increase in the gasoline-to-coke ratio of the catalyst and, further, that such increase was effected without the necessity of removing the nickel poison.

It is to be understood that the above description is merely illustrative of preferred embodiments of the invention. While such description has been directed particularly to the reactivation of nickel-poisoned siliceous cracking catalysts, it is contemplated that the method set forth may likewise be applicable for reactivation of various other catalytic composites which have become poisoned by the presence therein of metal contaminants, such as copper, iron, vanadium, and the like.

We claim:

1. A method for treating a nickel-poisoned siliceous hydrocarbon conversion catalyst, which comprises impregnating the poisoned catalyst with a small amount of chromia sufficient, following hereinafter-described steam-treatment, to overcome the poisoning effects of the nickel and thereafter subjecting the chromia-impregnated catalyst to steam-treatment at a temperature in the range of about 800 to about 1500° F. for at least about 2 hours.

2. A method for overcoming the poisoning effects of nickel contaminant in a siliceous cracking catalyst, which comprises impregnating said catalyst with a small amount of chromia, fallowed by steam-treatment of the catalyst at a temperature in the range of about 1000 to about 1300° F. for a period of between about 2 and about 48 hours.

3. A method for treating a nickel-poisoned siliceous cracking catalyst, which comprises contacting said catalyst with a solution of a chromium compound, which compound decomposes to leave a residue of chromia upon subsequent calcination of the catalyst, removing the catalyst from contact with said solution, calcining the same, and subjecting the calcined catalyst to steam-treatment at a temperature in the range of about 800 to about 1500° F. for at least about 2 hours.

4. A method for reactivating a siliceous cracking catalyst which has been poisoned by a small contaminating amount of nickel during the conversion of high boiling petroleum hydrocarbons to hydrocarbons boiling in the gasoline range, which comprises impregnating said poisoned catalyst with a small amount of chromia, and thereafter subjecting the chromia-impregnated catalyst to a mild steam-treatment.

5. A method for reactivating a siliceous cracking catalyst which has been poisoned by a small contaminating amount, less than about 0.20 per cent by weight, of nickel during the conversion of high boiling petroleum hydrocarbons to hydrocarbons boiling in the gasoline range, which comprises contacting said poisoned catalyst with a solution of a chromium compound capable of thermal decomposition to chromic oxide, removing the catalyst from contact with said solution, calcining the catalyst to effect the aforesaid thermal decomposition, and subjecting the treated catalyst to steam-treatment at a temperature in the range of about 1000 to about 1300° F. for a period of between about 2 and about 48 hours.

6. A method for reactivating a siliceous cracking catalyst which has been poisoned by a small contaminating amount of nickel during the conversion of high boiling petroleum hydrocarbons to hydrocarbons boiling in the gasoline range, which comprises impregnating said poisoned catalyst with a small amount of chromia by introducing an oil-soluble chromium compound into a charge of said high boiling petroleum hydrocarbons, and thereafter subjecting the chromia-impregnated catalyst to a mild steam-treatment.

7. A method for treating a poisoned siliceous cracking catalyst contaminated by a small amount, less than about 0.20 per cent by weight, of nickel, which comprises impregnating said catalyst with a chromium compound which, upon calcination of the catalyst, forms a small amount, less than about 0.5 per cent by weight, of chromia, calcining the impregnated catalyst, and subjecting the calcined catalyst to steam-treatment at a temperature in the range of about 800 to about 1500° F. for at least about 2 hours.

8. A method for treating a nickel-poisoned silica-alumina hydrocarbon conversion catalyst, which comprises impregnating the poisoned catalyst with a small amount of chromia sufficient, following hereinafter described steam-treatment, to overcome the poisoning effects of the nickel, and thereafter subjecting the chromia-impregnated catalyst to steam-treatment at a temperature in the range of about 800 to about 1500° F. for at least about 2 hours.

9. A method for reactivating a siliceous plural oxide gel cracking catalyst which has been poisoned by a small contaminating amount of nickel during the conversion of high boiling petroleum hydrocarbons to hydrocarbons boiling in the gasoline range, which comprises impregnating said poisoned catalyst with a small amount of chromia, and thereafter subjecting the chromia-impregnated catalyst to a mild steam-treatment.

References Cited in the file of this patent

UNITED STATES PATENTS

| | | |
|---|---|---|
| 2,014,503 | Nutting | Sept. 17, 1935 |
| 2,382,582 | Ruthruff | Aug. 14, 1945 |
| 2,423,833 | Hirsch | July 15, 1947 |
| 2,581,014 | Gorin et al. | Jan. 1, 1952 |
| 2,638,453 | Stan et al. | May 12, 1953 |
| 2,668,798 | Plank | Feb. 9, 1954 |
| 2,673,187 | Stine | Mar. 23, 1954 |

FOREIGN PATENTS

| | | |
|---|---|---|
| 280,712 | Great Britain | Nov. 24, 1927 |